J. I. D. BRISTOL.
DRILL AND TAP INDICATOR.
APPLICATION FILED NOV. 1, 1916.
1,246,536.
Patented Nov. 13, 1917.
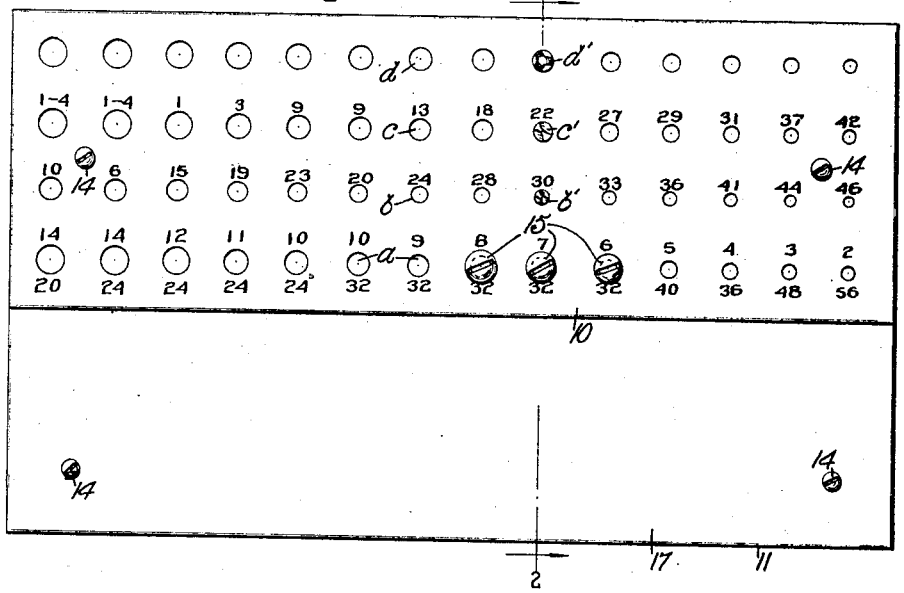
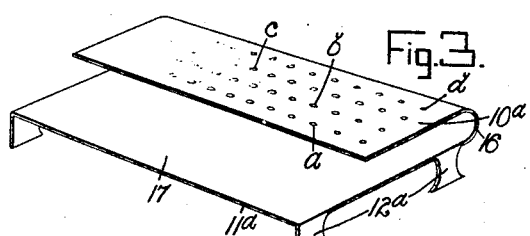
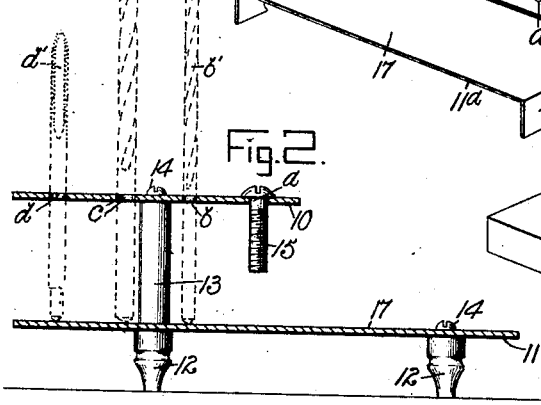
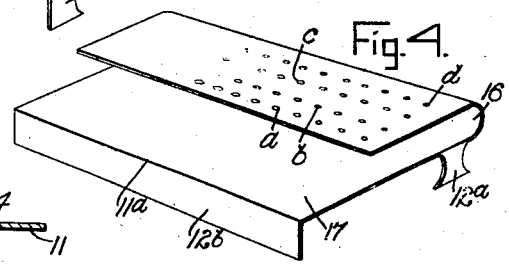
WITNESSES
C. K. Reichenbach.
Geo. L. Beeler
INVENTOR
J.I.D. Bristol
BY
ATTORNEYS

UNITED STATES PATENT OFFICE.

JOHN ISAAC DEVOE BRISTOL, OF CHAPPAQUA, NEW YORK.

DRILL AND TAP INDICATOR.

1,246,536.  Specification of Letters Patent.  Patented Nov. 13, 1917.

Application filed November 1, 1916. Serial No. 123,886.

*To all whom it may concern:*

Be it known that I, JOHN I. D. BRISTOL, a citizen of the United States, and a resident of Chappaqua, in the county of Westchester and State of New York, have invented a new and Improved Drill and Tap Indicator, of which the following is a full, clear, and exact description.

This invention has reference generally speaking to a drill and tap indicator for holding various drills and taps in easy and convenient reach, particularly for use on a metal worker's bench for the support or accommodation of sets of sample screws and the drills and taps used in connection therewith.

Among the objects of the invention, therefore, is to provide a simple and convenient holder for correlated groups or series of screws, drills and taps, by which the proper tap drill and body drill and the proper tap for use in connection with any selected screw can be immediately selected without possibility of mistake or loss of time.

More definitely stated: By virtue of the device herein shown, I provide a means whereby a workman given, for example, a certain size or sizes of machine screws for the assemblage of a job, may know almost instantly precisely which drills and taps to use for any particular size or species of screw provided for the job and to so place them while in the intervals of use that other taps or drills cannot be mistakenly used.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings, in which like reference characters designate the same parts in the several views, and in which Figure 1 is a plan view of one form of my improved indicator showing some of the sample screws in place and also indicating a view of the drills and tap to be used in connection with the use of each particular screw to be used for the job in hand;

Fig. 2 is a vertical transverse section on the line 2—2 of Fig. 2; and

Figs. 3, 4, and 5 are perspective views somewhat diagrammatical in nature, but indicating slightly modified forms of the indicator.

Referring now more particularly to Figs. 1 and 2, I show a tap and drill indicator comprising upper and lower parallel plates 10 and 11, the latter of which may be termed the base, which is indicated as being supported upon any suitable number or arrangement of feet 12. In this form of the invention, the upper plate or holder 10 is supported in spaced relation above the base by means of a pair of standards 13, and the several supporting devices are secured rigidly to the plates by means of screws 14 or their equivalent.

The upper plate or holder is provided with groups or series of holes, each group of holes being indicated as four in number and represented by letters *a*, *b*, *c*, and *d*. By preference these holes are all arranged in a straight line extending rearwardly from the front edge portion of the holder. The number of these groups may be varied indefinitely according to the tap and drill indicator desired for the exigencies of any particular kind of work to be carried on, but as a practical indication of a device of this nature, I show a device including fourteen of such groups for use with the fourteen different sized screws indicated upon the usual screw gage in common use.

All of the holes of a similar character may be arranged in a straight line as a matter of convenience, although there is less necessity for the lines to be straight longitudinally of the holder than in the case of the arrangement of each group. The holes *a* or the first holes of all of the groups are fitted to be provided with as many different sizes or types of screws indicated at 15, one of which screws is kept in its own particular hole *a*. These screws 15 are, in a full sized indicator, the fourteen different sized screws generally used for light work, and are identified or described by numbers adjacent to the upper edges of the holes, indicating the caliber or number of the screws, with the number of threads to the inch and by other numbers adjacent to the other holes in the same line, indicating the tap and body drill to be used with that particular size or sample of screw. All the holes, however, are smooth and have no other office than to hold the sample screws and the two drills and the tap used in connection therewith.

In other words: Directly at the rear of each hole *a* is located the hole *b* of the same group into which may be fitted and held a drill $b'$ which is of the precise caliber for boring the hole to be subsequently tapped to receive a screw of the type carried in a hole $a$ of the same group. In another hole $c$ in the same line of holes is held a body drill $c'$ of the exact caliber for drilling a hole to receive the shank or unthreaded part of the screw. In the hole $d$ of the same group or line of holes, is kept a tap $d'$ which corresponds both in caliber and number of threads per inch as the screw 15 pertaining to this group. It will be understood, therefore, that each group of holes will be supplied with one sample screw of a known or standard character carried in hole $a$ and that the remaining holes of the same series will be fitted with a tap drill, a body drill, and a tap corresponding to that particular screw. The caliber of the holes $b$, $c$, and $d$ should approximate the caliber of the tools to be held therein, although this is of secondary importance, the principal feature of the indicating means being the sample screw in each group.

Given a screw or set of screws of the same but unidentified character to use in a job, a workman by direct comparison will locate the gage or sample screw corresponding in number and number of threads per inch to the screws provided for the job. He then knows immediately without calipering his screws, counting the threads or other investigation, precisely which drills to use, the drills being thus found in the same group as the matched sample or gage screw.

In Fig. 3, the indicator comprises plates $10^a$ and $11^a$, which, as in Figs. 1 and 2, are held in spaced parallel relation to each other, and shows the extended base plate constituting a fixed stop and support for the tools held removably in the various holes $b$, $c$, and $d$. In this form of the invention, however, the two plates are integral with each other or are formed from a single strip of sheet material, such as sheet metal or other rigid material, the rear edges of the plates being connected by a vertical portion 16. The feet $12^a$, as indicated, are made from the same blank also and stamped out and turned down from the end of the base plate and perpendicular thereto.

In Fig. 4, the upper and lower plates are connected by the vertical portion 16, and the indicator, like Fig. 3 is made from a single sheet of rigid material, but in place of the front feed $12^a$ formed with the ends of the base, I may turn down a flange $12^b$ from the front edge of the base to constitute the front support. In Fig. 5 I carry forward the same idea of using less length of metal by omitting all of the feet from the ends of the base and providing a downwardly turned roll or extension $12^c$ to take the place of the rear feet $12^a$, and this extension merges thence upwardly into the vertical portion $16'$. This downward extension at the rear may be located back of all of the drills and taps and may have some width if desired to provide a pocket $16^a$, in which a pencil, scriber, drill punch, or other devices may be held if desired. It will, of course, be understood that in all forms of the device, the upper or holder plate will be provided with groups of holes $a$, $b$, $c$, and $d$, serving the functions fully set forth in connection with Figs. 1 and 2, and will provide a front base or tool table 17, for holding the drill and tap selected for use, in order that they may not be mislaid during the intervals of temporary non-use.

I claim:

1. The herein described drill and tap indicator comprising a pair of upper and lower parallel plates, the upper plate being provided with a plurality of series of groups of holes for sample screws, and drills and taps pertaining to such screws, and the lower plate being imperforate serving to support the drills and taps to be placed in the holes of the upper plate, said lower plate also being projected forwardly beyond the front edge of the upper plate, means integral with the upper and lower plates serving to connect the rear edges of the same, said connecting means being deflected downwardly to form a support for the rear edge of the lower plate and a receptacle for the tools, and the front edge of the lower plate having an integral downwardly projecting support, substantially as set forth.

2. The herein described drill and tap indicator comprising upper and lower plates, the upper plate being provided with a plurality of series of groups or holes for gage screws and drills and taps pertaining to said screws, a plurality of gage screws in said screw holes and constituting a part of the indicator device, the lower plate being imperforate serving to support the drills and taps to be placed in the holes of the upper plate, said lower plate also being projected forwardly beyond the front edge of the upper plate, means integral with the upper and lower plates serving to connect the rear edges of the same whereby the upper plate is supported from the lower plate, and means integral with the front part of the lower plate serving to support the same, substantially as set forth.

JOHN ISAAC DEVOE BRISTOL.

Copies of this patent may be obtained for five cents each, by addressing the "Commissioner of Patents, Washington, D. C."